Figure 1:
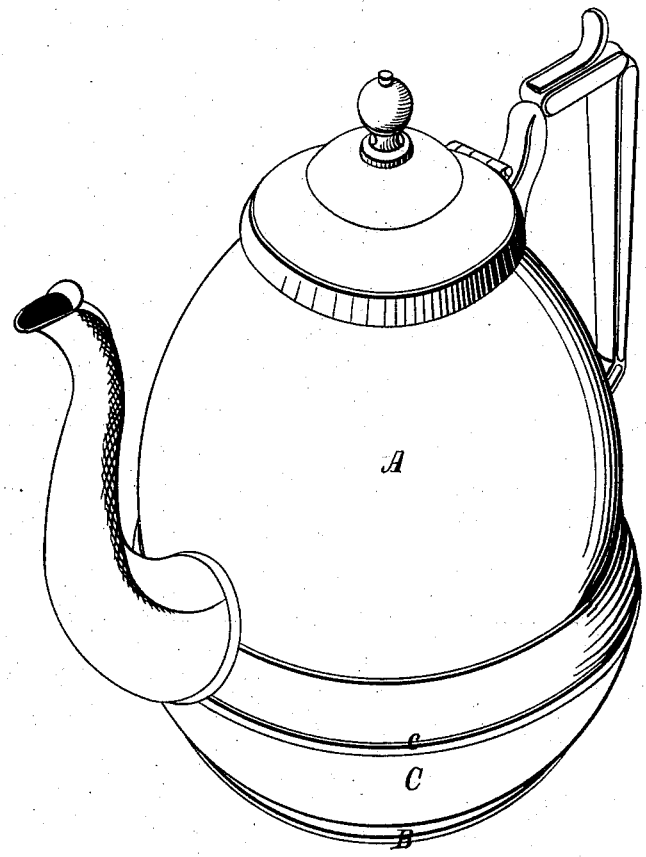

2 Sheets—Sheet 1.

M. SIMONS.
TEA AND COFFEE POTS.

No. 192,196. Patented June 19, 1877.

WITNESSES:
Jas. E. Hutchinson.
H. C. Hazard.

INVENTOR-
Michael Simons, by
Prindle & Co. his Attys.

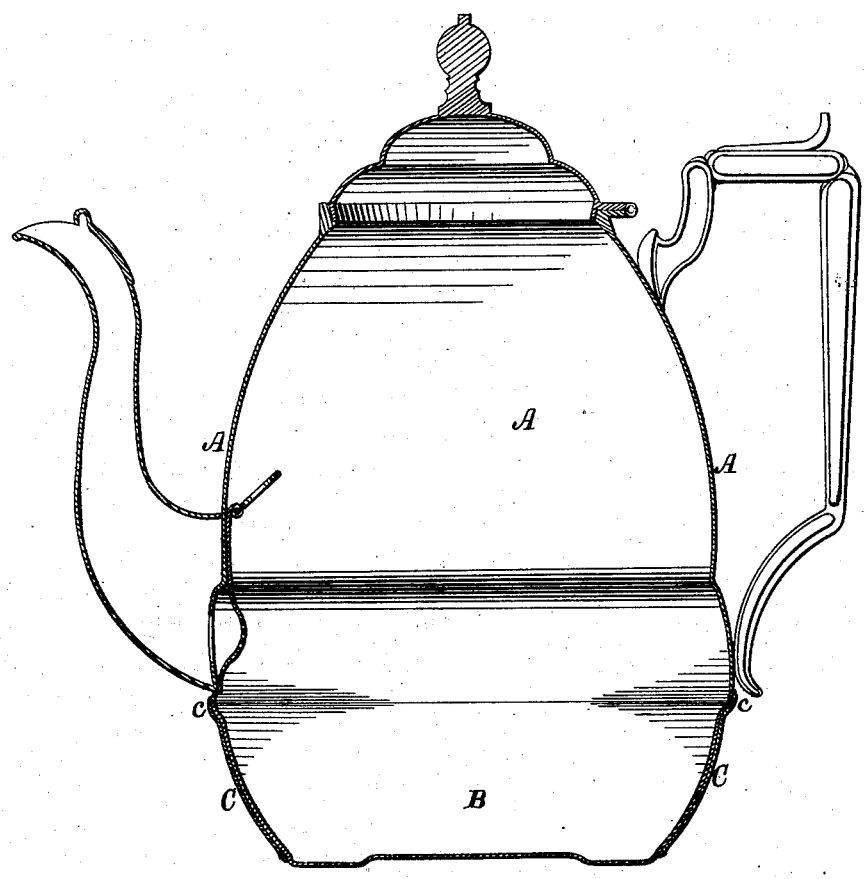

UNITED STATES PATENT OFFICE.

MICHAEL SIMONS, OF YALESVILLE, CONNECTICUT.

IMPROVEMENT IN TEA AND COFFEE POTS.

Specification forming part of Letters Patent No. 192,196, dated June 19, 1877; application filed August 27, 1874.

*To all whom it may concern:*

Be it known that I, MICHAEL SIMONS, of Yalesville, in the county of New Haven, and in the State of Connecticut, have invented certain new and useful Improvements in Tea and Coffee Pots; and do hereby declare that the following is a full, clear, and exact description thereof, reference being had to the accompanying drawings, making a part of this specification, in which—

Figure 1 is a perspective view of a tea or coffee pot constructed in accordance with my improved method; and Fig. 2 is a vertical central section of the same.

Letters of like name and kind refer to like parts in each of the figures.

In the construction of britannia tea and coffee pots it is necessary to employ bottoms of copper, iron, or other comparatively hard metal, because of the liability which exists of injury to the utensil in consequence of the relatively low temperature at which britannia fuses. It is also found necessary to extend the bottom of harder metal from one inch to one and one-half inch up the sides of the utensil, when, in order that the finish of said sides may be complete, said hard-metal portion requires to be tinned and burnished—operations which are laborious and expensive.

To remedy such difficulty and enable the article to be more cheaply constructed and its exterior to present a uniform appearance, is the design of my invention.

It consists in the means employed for protecting the sides of the bottom section by spinning a covering of soft metal over the exterior of the same, substantially as and for the purpose hereinafter shown.

In the annexed drawings, A represents a tea or coffee pot, the top and body of which are constructed of or from britannia metal, and have any desired form. The lower portion B of the pot, being subject to a high degree of temperature, is composed of iron, copper, or other comparatively hard metal, and may be stamped or spun from one piece; or, if deemed best, may be composed of two or more pieces with their edges united by seams.

The lower section B is now placed upon a suitable chuck, and a disk of thin britannia metal, C, having somewhat larger area than the exterior of said section, is placed against its bottom and spun over its sides, and caused to project about one-fourth of an inch beyond the upper edge of the same.

The britannia veneering C is then cut from the bottom of the section B, and its edge neatly turned down and soldered, after which said section is placed in position upon the body A, and the projecting edge $c$ of said veneering, which embraces the exterior of said body, is then soldered to the latter and burnished down.

The pot thus constructed presents exteriorally a surface of britannia metal, and has all the beauty and finish that could be had were it composed wholly of said metal, while, in consequence of the hard-metal lower section, the strength and durability of the article are as great as though hard metal was employed, the principal wear being sustained by said section.

Having thus fully set forth the nature and merits of my invention, what I claim as new is—

In a tea or coffee pot, the combination of the inner hard-metal bottom section B and the outer soft-metal covering C, substantially as and for the purpose specified.

In testimony that I claim the foregoing I have hereunto set my hand this 20th day of August, 1874.

MICHAEL SIMONS.

Witnesses:
ROBERT G. PIKE,
LIZZIE E. PIKE.